United States Patent
Bade et al.

(10) Patent No.: US 7,380,119 B2
(45) Date of Patent: May 27, 2008

(54) METHOD AND SYSTEM FOR VIRTUALIZATION OF TRUSTED PLATFORM MODULES

(75) Inventors: Steven A. Bade, Georgetown, TX (US); Linda Nancy Betz, Poughkeepsie, NY (US); Andrew Gregory Kegel, Redmond, WA (US); Michael J. Kelly, Staatsburg, NY (US); William Lee Terrell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 10/835,330

(22) Filed: Apr. 29, 2004

(65) Prior Publication Data
US 2005/0246552 A1    Nov. 3, 2005

(51) Int. Cl.
*G06F 1/24* (2006.01)
(52) U.S. Cl. .................. 713/155; 713/161; 713/164; 713/166
(58) Field of Classification Search ................ 713/155, 713/161, 164, 166
See application file for complete search history.

(56) References Cited

U.S. PATENT DOCUMENTS

| | | | |
|---|---|---|---|
| 2004/0205362 A1* | 10/2004 | Catherman et al. | 713/300 |
| 2005/0086509 A1* | 4/2005 | Ranganathan | 713/200 |
| 2005/0137889 A1* | 6/2005 | Wheeler | 705/1 |

* cited by examiner

*Primary Examiner*—Thomas R. Peeso
(74) *Attorney, Agent, or Firm*—Cardinal Law Group

(57) ABSTRACT

A method, an apparatus, a system, and a computer program product is presented for virtualizing trusted platform modules within a data processing system. A virtual trusted platform module along with a virtual endorsement key is created within a physical trusted platform module within the data processing system using a platform signing key of the physical trusted platform module, thereby providing a transitive trust relationship between the virtual trusted platform module and the core root of trust for the trusted platform. The virtual trusted platform module can be uniquely associated with a partition in a partitionable runtime environment within the data processing system.

6 Claims, 5 Drawing Sheets

METHOD AND SYSTEM FOR VIRTUALIZATION OF TRUSTED PLATFORM MODULES

BACKGROUND OF THE INVENTION

1. Field of the Invention

The present invention relates to an improved data processing system and, in particular, to a method and apparatus for data storage protection using cryptography.

2. Description of Related Art

Most data processing systems contain sensitive data and sensitive operations that need to be protected. For example, the integrity of configuration information needs to be protected from illegitimate modification, while other information, such as a password file, needs to be protected from illegitimate disclosure. As another example, a data processing system needs to be able to reliably identify itself to other data processing systems.

An operator of a given data processing system may employ many different types of security mechanisms to protect the data processing system. For example, the operating system on the data processing system may provide various software mechanisms to protect sensitive data, such as various authentication and authorization schemes, while certain hardware devices and software applications may rely upon hardware mechanisms to protect sensitive data, such as hardware security tokens and biometric sensor devices.

The integrity of a data processing system's data and its operations, however, centers around the issue of trust. A data processing system's data and operations can be verified or accepted by another entity if that entity has some manner for establishing trust with the data processing system with respect to particular data items or particular operations.

Hence, the ability to protect a data processing system is limited by the manner in which trust is created or rooted within the data processing system. To address the issues of protecting data processing systems, a consortium of companies has formed the Trusted Computing Group (TCG) to develop and to promulgate open standards and specifications for trusted computing. According to the specifications of the Trusted Computing Group, trust within a given data processing system or trust between a data processing system and another entity is based on the existence of a hardware component within the data processing system that has been termed the trusted platform module (TPM).

A trusted platform module has been generally described in a platform-independent manner, but platform-specific descriptions have been created for certain classes of systems, such as personal computers (PC's). Existing hardware for trusted computing has focused on implementations for a single trusted platform module for a single system. This situation is sufficient for simple servers and PC's, which tend to be relatively low-performance computers that meet the needs of stand-along computational environments or client-side processing environments.

The resources of high-performance servers, though, are typically divided among the needs of concurrently executing applications. Many servers support a partitionable environment that leverages the strong isolation of execution environments under the supervision of a hypervisor. It would be desirable to be able to certify a partitionable environment as being part of a trusted platform, but it would be impractical to provide a single trusted platform module for every possible partition within a partitionable environment.

Therefore, it would be advantageous to have a mechanism for sharing the capabilities of a single trusted platform module and allowing it to function on a one-to-one basis with each partition within a data processing system.

SUMMARY OF THE INVENTION

A method, an apparatus, a system, and a computer program product is presented for virtualizing trusted platform modules within a data processing system. A virtual trusted platform module along with a virtual endorsement key is created within a physical trusted platform module within the data processing system using a platform signing key of the physical trusted platform module, thereby providing a transitive trust relationship between the virtual trusted platform module and the core root of trust for the trusted platform. The virtual trusted platform module can be uniquely associated with a partition in a partitionable runtime environment within the data processing system.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
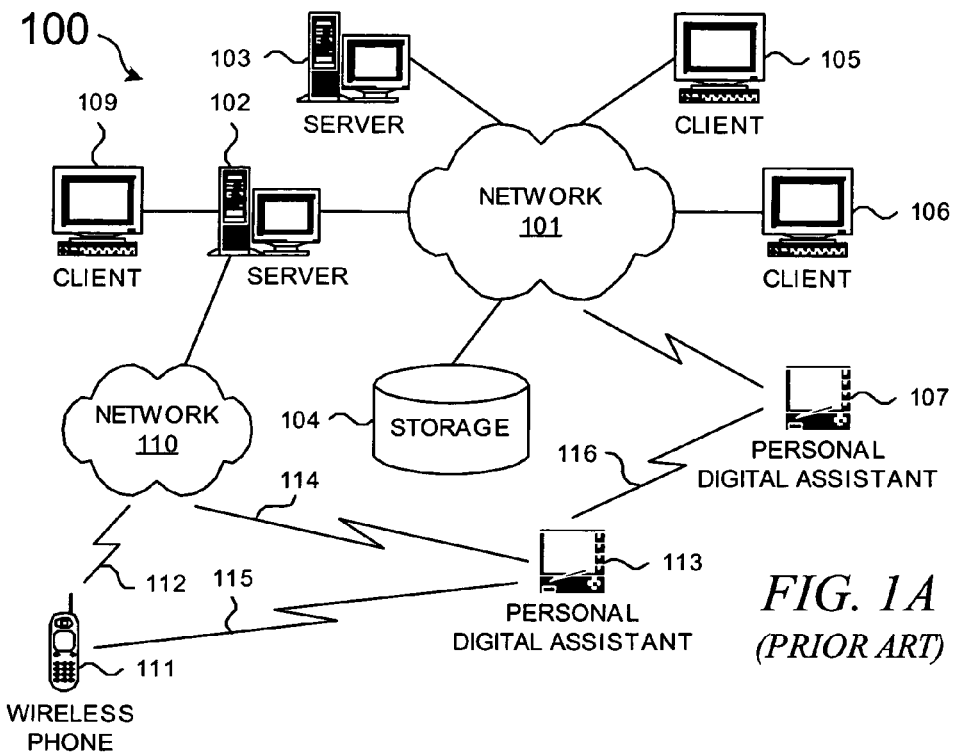
FIG. 1A depicts a typical network of data processing systems, each of which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

Figure 1B:
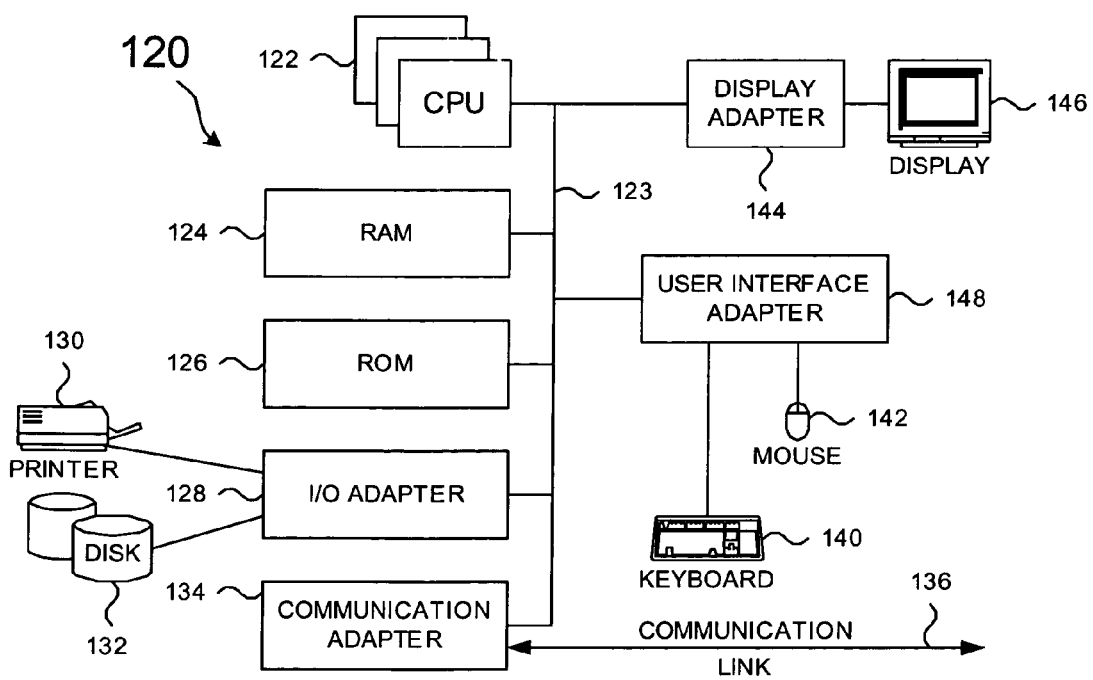
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

Figure 1C:
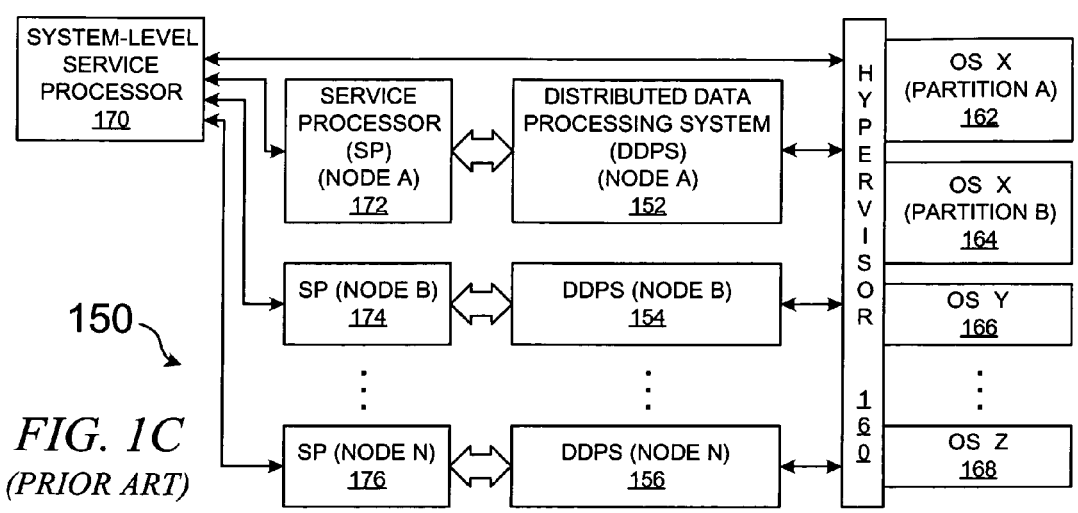
FIG. 1C depicts a block diagram that shows an example of a prior art distributed data processing system.

With reference now to FIG. 1C, a block diagram depicts an example of a prior art distributed data processing system. Distributed data processing system 150 contains multiple nodes 152-156, each of which may represent a single-processor or multi-processor device or card connected to a communication switch or a network; nodes 152-156 may be implemented as central electronic complex (CEC) units.

Hypervisor 160 supports multiple instances of one or more operating systems and/or operating system partitions 162-168 on the shared computational resources of the distributed data processing nodes of system 150, hereinbelow simply referred to as partitions or logical partitions. Hypervisor 160 communicates with system-level service processor 170, which is responsible for booting system 150 and for monitoring the availability of the shared resources. Each distributed data processing node is associated with a service processor, e.g., service processors 172-176, each of which is responsible for booting its associated node and for assisting system-level service processor 170 in monitoring each of the nodes; a service processor may be associated with a node through a variety of physical connections to its associated node, e.g., the service processor's hardware card may attach to a PCI bus. It should be noted that each node may have a plurality of service processors, although only one service processor would be responsible for booting its associated node.

The present invention could be implemented on a variety of hardware platforms and computational environments; FIG. 1A, FIG. 1B, and FIG. 1C are intended as examples of a heterogeneous computing environment and not as architectural limitations for the present invention. In addition to being able to be implemented on a variety of hardware platforms and computational environments, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above. More specifically, though, the present invention is directed to trusted computing platforms. Before describing the present invention in more detail, though, some background information about trusted computing platforms is provided in FIG. 2 and FIG. 3 for evaluating the operational efficiencies and other advantages of the present invention. Although the present invention may be implemented in conjunction with a variety of trusted computing platforms, possibly in accordance with one or more standards, the examples of the present invention hereinbelow employ the terminology and examples from the standards and/or specifications that have been promulgated by the Trusted Computing Group (TCG); it should be noted, though, that the examples are not meant to imply architectural, functional, nor definitional limitations with respect to embodiments of the present invention.

Figure 2:
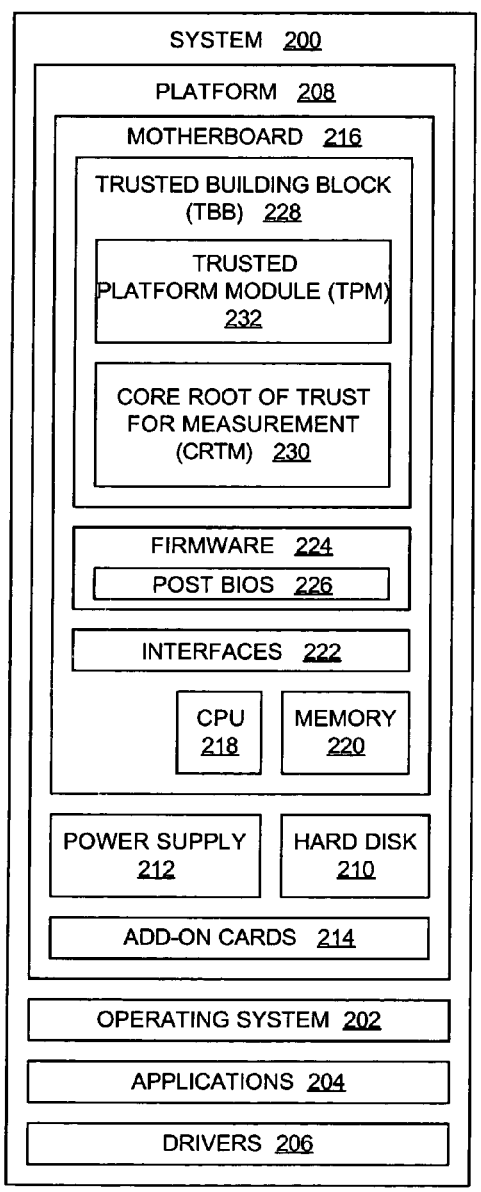
FIG. 2 depicts a block diagram that shows an example of a typical trusted platform architecture.

With reference now to FIG. 2, a block diagram depicts some of the components in a data processing system that is constructed using a model of a trusted platform architecture. Trusted platform architectures may be implemented for particular computational environments or for particular classes of devices; FIG. 2 depicts a trusted platform architecture in accordance with the TCG's PC-specific implementation specification.

System 200 supports execution of software components, such as operating system 202, applications 204, and drivers 206, on its platform 208. The software components may be received through a network, such as network 101 that is shown in FIG. 1A, or they may be stored, e.g., on hard disk 210. Platform 208 receives electrical power from power supply 212 for executing the software components on add-on cards 214 and motherboard 216, which includes typical components for executing software, such as CPU 218 and memory 220, although motherboard 216 may include multiple CPU's. Interfaces 222 connect motherboard 216 to other hardware components within system 200, and firmware 224 contains POST BIOS (power-on self-test basic input/output system) 226.

Motherboard 216 also comprises trusted building block (TBB) 228; motherboard 216 is supplied by a manufacturer with TBB 228 and other components physically or logically attached and supplied by the manufacturer. TBB 228 comprises the combination of the core root of trust for measurement (CRTM) component 230, the trusted platform module (TPM) 232, the connection of the CRTM to motherboard 216, and the connection of the TPM to motherboard 216.

TPM 232 is explained in more detail with respect to FIG. 3 hereinbelow. CRTM 230 is an immutable portion of the platform's initialization code that executes upon a platform reset; the platform's execution must begin at the CRTM upon any platform reset event. In this manner, the trust in the platform is based on the CRTM and the behavior of the TPM, and the trust in all measurements is based on the integrity of the CRTM. In the example that is shown in FIG. 2, the BIOS may be assumed to include a BIOS Boot Block and POST BIOS 226; each of these are independent components that can be updated independent of each other, wherein the manufacturer must control the update, modification, and maintenance of the BIOS Boot Block, but a third party supplier may update, modify, or maintain the POST BIOS component. In the example that is shown in FIG. 2, the CRTM may be assumed to be the BIOS Boot Block, and the POST BIOS is a measured component of the chain of trust. Alternatively, the CRTM may comprise the entire BIOS.

Figure 3:
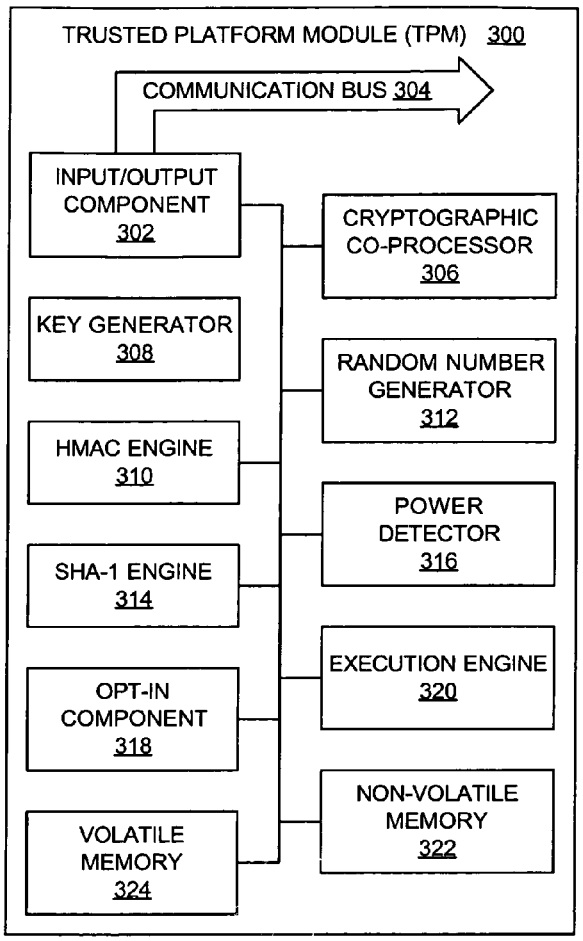
FIG. 3 depicts a block diagram that shows some of the major components of a typical trusted platform module.

With reference now to FIG. 3, a block diagram depicts some of the major components of a trusted platform module according to TCG specifications. Trusted platform module 300 comprises input/output component 302, which manages information flow over communications bus 304 by performing appropriate protocol encoding/decoding operations and routing of messages to appropriate components. Cryptographic co-processor 306 performs cryptographic operations within a trusted platform module. Key generator 308 creates symmetric keys and RSA (named for its inventors Rivest, Shamir, and Adelman) asymmetric cryptographic key pairs. HMAC engine 310 performs HMAC (Keyed-Hashing for Message Authentication) calculations, whereby message authentication codes are computed using secret keys as integrity checks to validate information transmitted between two parties, e.g., in accordance with Krawczyk et al., "HMAC: Keyed-Hashing for Message Authentication", Request for Comments (RFC) 2104, Internet Engineering Task Force (IETF), February 1997.

Random number generator 312 acts as a source of randomness for the computation of various values, such as nonces, keys, or other values. SHA-1 engine 314 implements the SHA-1 hash algorithm. Power detector 316 manages the power states of a trusted platform module in association with the power states of the platform. Opt-in component 318 maintains the state of persistent and volatile flags and enforces semantics associated with those flags such that the trusted platform module may be enabled and disabled. Execution engine 320 runs program code to execute commands that the trust platform module receives through input/output component 302. Non-volatile memory 322 stores persistent identity and state associated with the trusted platform module; the non-volatile memory may store static data items but is also available for storing dynamic data items by entities that are authorized by the trusted platform module owner, whereas volatile memory 324 stores dynamic data items.

Given the background information on trusted computing platforms that has been described with respect to FIG. 2 and FIG. 3, a detailed description of the present invention is provided hereinbelow with respect to the remaining figures. As noted above, high-performance servers are typically divided among the needs of concurrently executing applications. Many servers support a partitionable environment that leverages the strong isolation of execution environments under the supervision of a hypervisor, such as system 150 that is shown in FIG. 1C. However, typical trusted platforms have been designed such that a single trusted platform module exists within a trusted platform architecture. This design would require unacceptable restrictions in a high-performance server or similar distributed data processing system, yet it would be impractical to provide a single trusted platform module for every possible partition within a partitionable environment in order to be able to certify a partitionable environment as being part of a trusted platform. Hence, there is a need for a mechanism for sharing the capabilities of a single trusted platform module and allowing it to function on a one-to-one basis with each partition within a data processing system. The present invention addresses this problem by providing a mechanism for enabling virtualization of trusted platform modules in a partitionable environment such that the partitionable environment can be regarded as a trusted platform, as explained in more detail hereinbelow.

Figure 4:
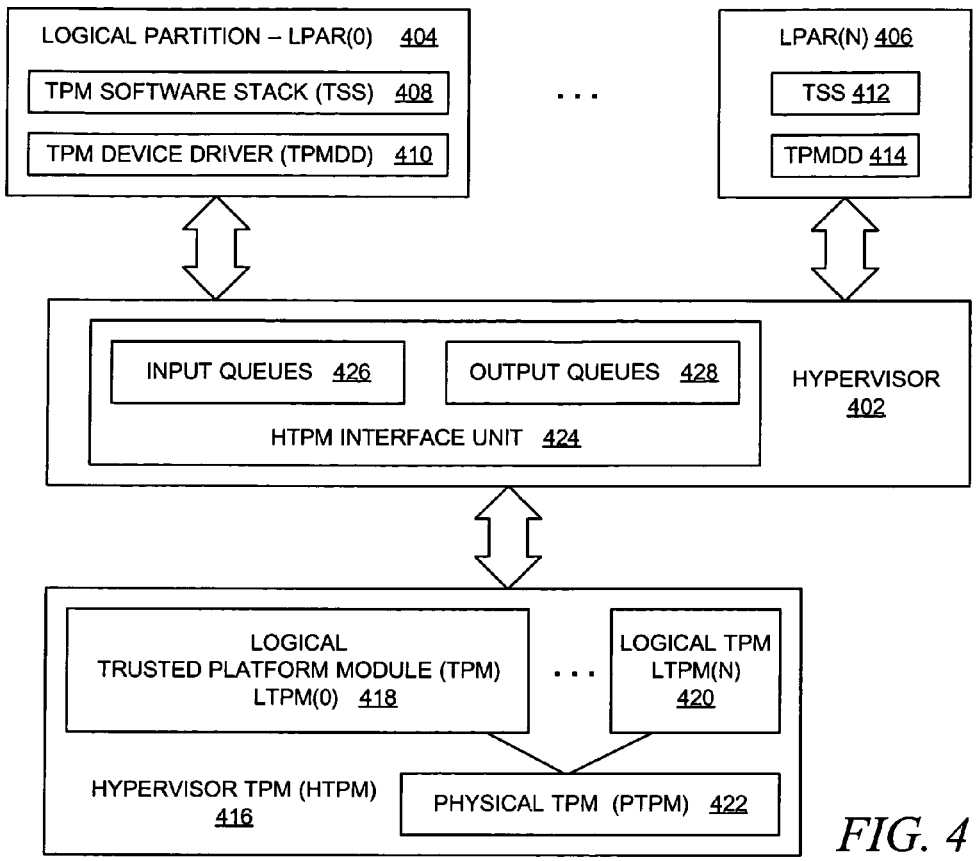
FIG. 4 depicts a block diagram that shows a logical organization for logical trusted platform modules in a hypervisor-based execution environment within a data processing system.

With reference now to FIG. 4, a block diagram depicts a logical organization for logical trusted platform modules in a hypervisor-based execution environment within a data processing system in accordance with an embodiment of the present invention. Data processing system 400 contains a hypervisor 402 that supports multiple instances of one or more operating systems and/or logical partitions (LPAR's) 404 and 406 on the shared computational resources of data processing system 400. LPAR 404 contains TCG software stack (TSS) 408 and TPM device driver (TPMDD) 410, while LPAR 406 contains TSS 412 and TPMDD 414. TSS 408 and TSS 412 implement the specification of the host programming interfaces that an operating system, an application, or other software component utilizes to interface with a TPM. TSS comprises: the TSS service provider, to which an entity may interface via common application programming interfaces (API's); the TSS core services, which provides centralized management of key storage, contexts, and handles the direct interaction with the trusted platform module on the host; and the TPM device driver library and the TPMDD, such as TPMDD 410 or TPMDD 414. Generally, all interfacing to the trusted platform module occurs through TSS service provider interface (TSPI) or an API above the TSPI.

With the present invention, hypervisor 402 presents hypervisor TPM (HTPM) 416 as a single trusted platform module to its supported logical partitions such that the logical partitions appear to interact with one trusted platform module in a unique, one-to-one manner; in other words, HTPM 416 provides the functionality of a trusted platform module for system 400 from the perspective of the system as a whole.

However, HTPM 416 is implemented in a manner to support multiple virtualized TPM's, e.g., logical TPM (LTPM) 418 and LTPM 420. When the hypervisor creates a logical partition, the hypervisor instantiates an LTPM and computationally associates the LTPM with its logical partition; when the hypervisor terminates a logical partition, the hypervisor destroys its associated LTPM. Each LPAR within system 400 is uniquely associated with an LTPM, each of which is anchored to physical TPM (PTPM) 422.

HTPM 416 is accessed through HTPM interface unit 424 in hypervisor 402. A trusted platform module is specified as an I/O device with operations into it being asynchronous; in the present invention, HTPM 416 is represented as a virtual I/O device, i.e., a logical I/O device. Operations to the HTPM, e.g., functional calls or requests from LPAR 404 to HTPM 416, are placed onto input queues 426, which causes a trap into hypervisor 402. Hypervisor 402 re-queues the operation to HTPM 416, where the TPM functions are performed on a first-in, first-out basis. When the TPM function is complete, HTPM 416 places the results on output queues 428, which also causes a trap into hypervisor 402; hypervisor 402 then passes the results back to the requesting logical partition. In one embodiment, HTPM interface unit 424 supports multiple input queues 430 and multiple output queues 432 such that each LTPM has an associated input queue and an associated output queue.

In one embodiment, HTPM 416 is embedded within hypervisor 402. In an alternative embodiment, HTPM 416 is managed by hypervisor 402 within a reserved logical partition, which would be logically part of the hypervisor, e.g., its code is maintained as part of the certified hypervisor; the hypervisor would re-create the HTPM partition upon each reboot. Managing the HTPM in a separate partition provides additional advantages. Many of the TPM operations utilize the RSA algorithm, which is computationally expensive, and the incorporation of the HTPM within the hypervisor would result in execution path lengths that would be unacceptable. Hence, by placing the HTPM within a partition, the hypervisor maintains its execution characteristics while relegating the TPM functions to a lower priority. Moreover, the placement of the HTPM in a separate partition provides the hypervisor with greater flexibility in protecting the memory that is used by the HTPM without impacting the hypervisor.

As mentioned above, the present invention provides a mechanism for enabling virtualization of trusted platform modules in a partitionable environment, i.e., the creation of logical TPM's or virtual TPM's, similar to those that are shown in FIG. 4. To that end, the present invention comprises a technique for dynamically instantiating cryptographic key material for each logical TPM such that the cryptographic key material is associated with the trusted hardware, as explained in more detail hereinbelow.

According to the specifications of the Trusted Computing Group, a physical TPM, such TPM 232 that is shown in FIG. 2, contains an endorsement key. An endorsement key is an RSA key pair that is unique to that individual module; the public portion of the endorsement key is referred to as the PUBEK, and the private portion of the endorsement key is referred to as the PRIVEK. The endorsement key is transitively bound to the trusted platform via the associated TPM as follows: an endorsement key is bound to one and only one TPM; a TPM is bound to one and only one trusted platform; therefore, there is a one-to-one correspondence between an endorsement key and a trusted platform. The TPM has the endorsement key generated before a customer receives the associated platform. The entity that causes the generation of the endorsement key is also the entity that will create a credential that attests to the validity of the TPM and its endorsement key; the endorsement key is sometimes regarded as the combination of the endorsement credential along with the RSA key pair. The TPM can generate the endorsement key internally or by using an outside key generator, after which the key would be inserted (also known as injecting or squirting) into the TPM. Access to the PRIVEK and the PUBEK must only be via TPM-protected capabilities. Exporting the PRIVEK from the TPM must not occur, so the PRIVEK exists only in a TPM-shielded location. Exporting the PUBEK from the TPM under controlled circumstances is allowable, but access to the PUBEK is restricted to entities that have a need to know.

For an entity to trust a platform that includes a logical TPM in accordance with the present invention such that the entity can regard the platform as a trusted platform, the logical TPM must have a transitive trust relationship with a physical TPM, i.e., the logical TPM must be anchored to the physical TPM. In other words, a logical TPM is transitively bound to a trusted platform via the physical TPM as follows: a logical TPM is bound to one and only one physical TPM; a physical TPM is bound to one and only one trusted platform; therefore, there is a one-to-one correspondence between an logical TPM and a trusted platform.

At the same time, a logical TPM must have somewhat similar attributes to a physical TPM. Hence, in the present invention, a logical TPM also has an endorsement key, referred to as its virtual endorsement key (vEK). The virtual endorsement key acts in a manner similar to an endorsement key that might be used within a physical TPM.

According to the TCG specifications, an endorsement key should not perform some cryptographic operations for certain security reasons. For example, the endorsement key should be used for encryption operations but not for signature operations. Instead, in the TCG specifications, an attestation identity key (AIK) is used as an alias to the endorsement key. An attestation identity key is an RSA key that is generated sometime after the establishment of TPM ownership, and a TPM can generate an unlimited number of attestation identity keys. In particular, an attestation identity key is used for signature operations.

Therefore, in an embodiment of the present invention that adheres to the TCG security model, a virtual endorsement key of a logical TPM may be an attestation identity key of the physical TPM. Alternatively, the endorsement credential of a virtual endorsement key may be signed by an attestation identity key. In an alternative embodiment in which the present invention adheres to a different security model, the physical endorsement key may sign an endorsement credential of a virtual endorsement key of a logical TPM. In order to allow for the present invention to adhere to different security models without restriction and to avoid inconsistencies in terminology, the endorsement key of a physical TPM is herein referred to as a platform signing key (pSK). In certain embodiments, the platform signing key may be identical to an endorsement key in a physical TPM.

In a manner similar to that described above for a physical TPM, an virtual endorsement key is transitively bound to a trusted platform via the associated logical TPM as follows: a virtual endorsement key is bound to one and only one logical TPM; a logical TPM is bound to one and only one trusted platform; therefore, there is a one-to-one correspondence between a virtual endorsement key and a trusted platform.

Since a logical TPM is created as necessary under the control of a hypervisor in a runtime environment of a data processing system, a logical TPM cannot be bound to a trusted platform when the trusted platform is manufactured, i.e., in the way that a physical TPM is bound to a trusted platform. Thus, a virtual endorsement key cannot be signed by the manufacturer of the physical TPM in order to bind the virtual endorsement key to the physical TPM. Likewise, a virtual endorsement key is not signed by the manufacturer or creator of the logical TPM, e.g., the hypervisor, because the goal is not to bind the virtual endorsement key to the hypervisor but to bind the virtual endorsement key to the physical TPM. Hence, the virtual endorsement key must be signed by the platform signing key, i.e., the pSK, of the physical TPM with which the logical TPM is associated, i.e., the physical TPM to which the logical TPM is anchored.

Given that a goal of the present invention is the ability to certify a runtime environment that includes a logical TPM as a trusted platform, it follows that a logical TPM should have attributes that are similar to a physical TPM. To this end, a virtual endorsement key is also protected by storing it within a shielded location of the physical TPM. Hence, since each logical TPM has a unique virtual endorsement key, the virtual endorsement key of each logical TPM is stored in the non-volatile storage of the physical TPM to which a logical TPM is anchored.

However, in a runtime environment that includes a hypervisor, the runtime environment may comprise many partitions that the hypervisor creates and destroys over a long period. As noted above, in a hypervisor-based data processing system that is implemented in accordance with an embodiment of the present invention, a hypervisor can uniquely associate a logical TPM with each partition that is supported by the hypervisor. Thus, over time, the virtual endorsement keys of many partitions would need to be stored in the non-volatile storage of the physical TPM. However, the non-volatile storage in a physical TPM is limited, thereby necessitating the removal of a virtual endorsement key from the physical TPM when a partition is terminated, i.e., when the logical TPM that is associated with the virtual endorsement key is destroyed.

According to the TCG trust model, when a TPM is removed from its trusted platform, its endorsement key, in particular its PRIVEK, should be destroyed. Thus, in a hypervisor-based data processing system that is implemented in accordance with an embodiment of the present invention as noted immediately above, the present invention adheres to the requirements of the TCG trust model with respect to destruction of an endorsement key.

On the other hand, a hypervisor has the ability to restore a runtime environment. For example, a hypervisor might need to restore a partition after a failure recovery procedure. More commonly, a hypervisor has the ability to instantiate a partition when requested to do so or when required to do so for some operational or administrative purpose. To a certain extent, when the hypervisor restores a runtime environment, the runtime environment should be re-created in an identical manner with respect to certain characteristics, especially with respect to certain configuration elements of the partition. In particular, it should be assumed that a partition would rely on the trusted platform characteristics of its runtime environment; upon each instantiation of a partition, the partition would assume that the trusted platform module of a given platform would remain unchanged because the TCG trust model requires that a TPM remain bound to a platform in order for the platform to be remain a trusted platform. In a prior art system, these requirements are not problematic because, assuming that no one tampers with the hardware platform, the physical TPM does not change. However, with the present invention, a partition is supported by a virtual TPM; although the virtual TPM is anchored to a physical TPM, this fact is unbeknownst to the partition (and its constituent software components) because the partition only knows that it is interacting with a functional TPM.

Thus, a hypervisor has the ability to restore or re-create a partition. The hypervisor must ensure that the partitions do not detect changes in the underlying platform between instantiations on the same platform in order to ensure that the hypervisor operates in a transparent manner. Hence, when a partition is restored, the hypervisor needs the ability to instantiate an identical logical TPM, including an identical virtual endorsement key for the logical TPM, even though the virtual endorsement key would have been destroyed when the logical TPM was terminated along with the partition. Therefore, the present invention provides a technique by which cryptographic key material is dynamically instantiated for each logical TPM such that the cryptographic key material is associated with the trusted hardware and is dynamically reproducible when re-instantiating a logical TPM, as explained in more detail below with respect to the remaining figures.

Figure 5:
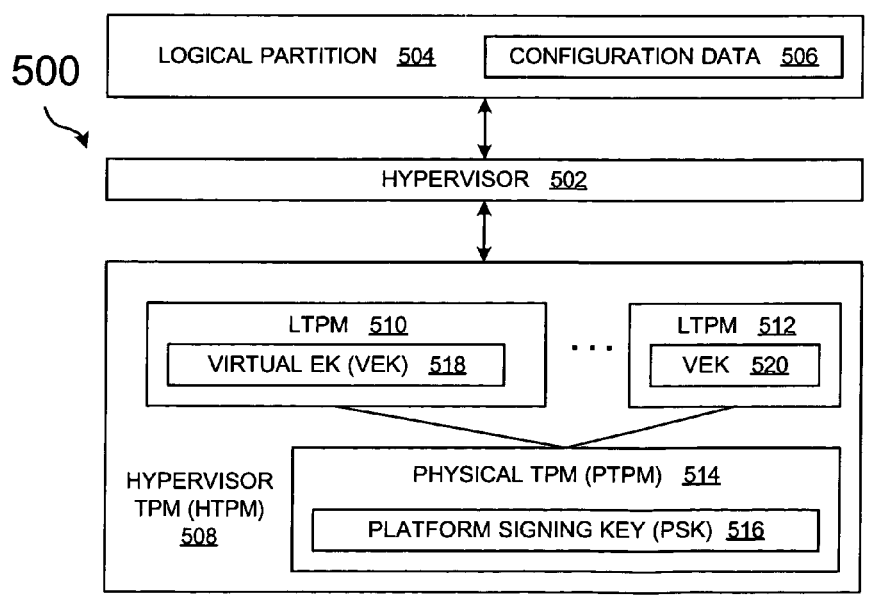
FIG. 5 depicts a block diagram that shows a logical organization for logical trusted platform modules that contain virtual endorsement keys within a hypervisor-based execution environment in a data processing system in accordance with an embodiment of the present invention.

With reference now to FIG. 5, a block diagram depicts a logical organization for logical trusted platform modules that contain virtual endorsement keys within in a hypervisor-based execution environment in a data processing system in accordance with an embodiment of the present invention. FIG. 5 is similar to FIG. 4; system 500 contains hypervisor 502 that supports multiple logical partitions, such as LPAR 504. More importantly to the description hereinbelow, hypervisor 502 instantiates LPAR 504 using configuration data 506. Although hypervisor 502 may employ a large amount of configuration information when creating a logical partition, configuration data 506 represents any data that uniquely identifies or is essential to LPAR 504; any modification to configuration data 506 would represent a change in the identity of or the essential features of LPAR 504, thereby creating a new unique logical partition.

Hypervisor 502 presents hypervisor TPM (HTPM) 508 as a single trusted platform module to its supported logical partitions such that the logical partitions appear to interact with one trusted platform module in a unique, one-to-one manner; in other words, HTPM 508 provides the functionality of a trusted platform module for system 500 from the perspective of the system as a whole. HTPM 508 is implemented in a manner to support multiple virtualized TPM's, e.g., logical TPM (LTPM) 510 and LTPM 512, in a manner similar to that described above in more detail with respect to FIG. 4. Each LPAR within system 500 is uniquely associated with a logical TPM, each of which is anchored to physical TPM (PTPM) 514. PTPM 514 is manufactured to include platform signing key (pSK) 516; as explained in more detail hereinbelow, pSK 516 and configuration data 506 are used by hypervisor 502 to instantiate vEK 518 and vEK 520 within LTPM 510 and LTPM 512, respectively.

Figure 6:
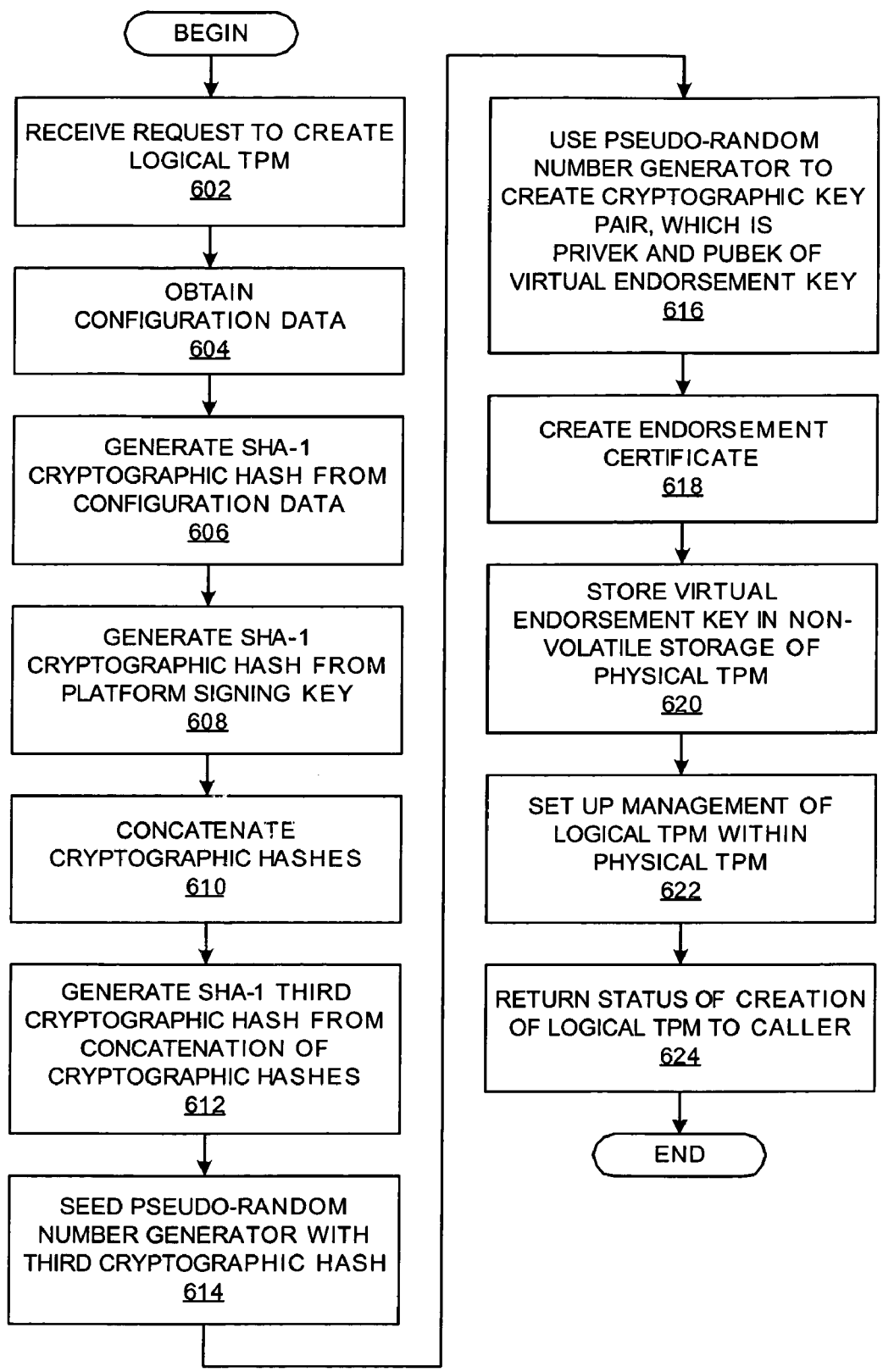
FIG. 6 depicts a flowchart that shows a process by which a virtual endorsement key is created for a virtualized or logical trusted platform module.

With reference now to FIG. 6, a flowchart depicts a process by which a virtual endorsement key is created for a virtualized or logical trusted platform module in accordance with an embodiment of the present invention. The flowchart that is shown in FIG. 6 focuses on the process for the creation of the virtual endorsement key; it may be assumed that this process is performed as part of a larger process during which a virtualized or logical TPM is being instantiated, which in turn may be assumed to be performed as part of an even larger process during which a logical partition is created under the control of a hypervisor. In one embodiment of the present invention, though, the process that is shown in FIG. 6 may be considered in isolation as a process by which a virtual endorsement key is created for a virtualized or logical trusted platform module without regard to a larger context of a hypervisor-based runtime environment.

It is essential to the process that is shown in FIG. 6 that the entity that performs the process must have the ability to use a copy of the PRIVEK of the pEK that is stored within the physical TPM (along with other information). According to the TCG trust model, the PRIVEK must not be disclosed outside of the physical TPM, after the manufacture of the physical TPM.

Thus, in one embodiment of the present invention that complies with the requirements of the TCG trust model, an entity exterior to the physical TPM cannot obtain a copy of the PRIVEK of the pEK, and an entity exterior to the physical TPM cannot perform the process that is shown in FIG. 6; in this embodiment of the present invention, the physical TPM must perform the process that is shown in FIG. 6 in order to comply with the requirements of the TCG trust model. A specification of the physical TPM could be extended to include the functionality that is described in FIG. 6; likewise, a physical TPM could be manufactured to include the functionality that is described in FIG. 6. In an alternative embodiment, some other entity comprises the functionality to perform the process that is shown in FIG. 6 in accordance with an alternative trust model. However, the process that is described hereinbelow complies with the requirements of the TCG trust model such that a physical TPM performs the process that is shown in FIG. 6.

Referring now to FIG. 6, the process commences with a physical TPM receiving from a requesting entity a request to create a virtual or logical TPM (step 602). The physical TPM obtains configuration data as an input to the logical TPM creation function (step 604); as explained above with respect to FIG. 5, the configuration data is unique or essential data for an entity, such as a logical partition under the control of a hypervisor, that is to be associated with the logical TPM that is being created, thereby trust-anchoring the entity with the logical TPM. In a preferred embodiment, the configuration data is provided by the requesting entity; in an alternative embodiment, the configuration data is retrieved.

The physical TPM generates an SHA-1 cryptographic hash of the configuration data (step 606), e.g., using a component similar to SHA-1 engine 314 that is shown in FIG. 3. In addition, the physical TPM generates an SHA-1 cryptographic hash of the contents of the platform signing key (step 608); at a minimum, the PRIVEK of the platform signing key must be used as input to the hash function, but preferably the entire contents of the platform signing key are used.

The resulting hash value for the configuration data and the resulting hash value for the platform signing key are concatenated (step 610). The concatenated value is then used as input to generate a third SHA-1 hash value (step 612), and this third hash value is used to seed a pseudo-random number generator, such as random number generator 312 that is shown in FIG. 3, i.e., the third hash value is set as the seed value for the pseudo-random number generator (step 614).

The pseudo-random number generator is then used in the generation of an RSA key pair (step 616), e.g., using a component similar to key generator 308 that is shown in FIG. 3. This generated key pair is the PRIVEK and the PUBEK of the virtual endorsement key, which requires an associated endorsement credential. The physical TPM generates a public key certificate for the key pair that is signed by the physical TPM using its platform signing key (step 618), thereby completing the process of creating a virtual endorsement key and its associated endorsement credential. The physical TPM then stores the virtual endorsement key in its protected non-volatile storage (step 620) and performs any other activities within the physical TPM that is necessary for the management of the logical TPM within the physical TPM (step 622). The result of the creation of the virtual or logical TPM, such as a status or result code or some other data, is then returned to the requesting entity (step 624), thereby concluding the process. At some later point in time, additional TPM-related functions may be performed with respect to the newly created logical TPM, such as changes in ownership, integrity metric functions, etc., may be performed.

It was asserted above that the present invention provides a technique by which cryptographic key material is dynamically instantiated for a logical TPM such that the cryptographic key material is associated with the trusted hardware and is dynamically reproducible when re-instantiating a logical TPM. While FIG. 6 depicts the computational mechanism for accomplishing this assertion, the depicted process is successful for the following reasons.

Given the definition of the configuration data above, it may be assumed that the configuration data that is associated with a partition remains unchanged between subsequent instantiations of the partition; otherwise, the change in the configuration data would cause the partition to be recognized or regarded as a new, different partition. This configuration data is used to re-instantiate a logical TPM that is associated with the re-instantiated partition. The configuration data is input into the function that creates the logical TPM, which subsequently results in a seed value for the pseudo-random number generator. A pseudo-random number generator has the property that if it is seeded with the same value, then it will always generate the same string of random data. Since the configuration data for a given partition remains the same between subsequent instantiations of the partition, then the output string from the pseudo-random number generator remains the same.

Likewise, the key generator has the property that if the same input data is used in the generation of the key material, then the same key pair will result. Since the output string from the pseudo-random number generator remains the same between subsequent instantiations of the partition, the same input data is used for the key generator, thereby resulting in the generation of the same key pair, i.e., virtual endorsement key.

In summary, the configuration data remains the same between subsequent instantiations of a partition, and the present invention provides a method of ensuring that the virtual endorsement key is regenerated between subsequent instantiations, thereby enabling the re-instantiation of a logical TPM that is to be re-associated with the re-instantiated partition.

The advantages of the present invention should be apparent in view of the detailed description that is provided above. In order to able to certify a partitionable environment as being part of a trusted platform, there is a need for a mechanism for sharing the capabilities of a single trusted platform module and allowing it to function on a one-to-one basis with each partition within a data processing system. The present invention addresses this problem by providing a mechanism for enabling virtualization of trusted platform modules in a partitionable environment such that the partitionable environment can be regarded as a trusted platform. By being able to re-create a virtual endorsement key, a unique virtual trusted platform module based on a virtual endorsement key can be created on a one-to-one basis with a partition, yet the virtual trusted platform module is anchored to a physical trusted platform module. A plurality of these virtual trusted platform modules can be anchored to a single physical trusted platform module in a many-to-one relationship. Thus, a single hardware root of trust can be shared within a partitionable environment.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for virtualizing trusted platform modules within a data processing system, the method comprising:

receiving at a physical trusted platform module from a requesting entity a request to create a virtual trusted platform module;

creating a virtual trusted platform module by the physical trusted platform module, wherein the virtual trusted platform module has a transitive trust relationship with the physical trusted platform module;

sending a response to the requesting entity; and associating the virtual trusted platform module with a partition in a partitionable runtime environment within the data processing system.

2. The method of claim 1 further comprising:

generating a virtual endorsement key using a platform signing key of the physical trusted platform module such that the virtual endorsement key provides the transitive trust relationship.

3. The method of claim 2 further comprising:

storing the virtual endorsement key within non-volatile storage in the physical trusted platform module.

4. The method of claim 1 further comprising:

generating a virtual endorsement key using the configuration data from the partition and a platform signing key of the physical trusted platform module such that the virtual endorsement key provides the transitive trust relationship.

5. The method of claim 4 further comprising:

computing a first cryptographic hash value from the platform signing key;

computing a second cryptographic hash value from the configuration data from the partition;

computing a third cryptographic hash value from a concatenation of the first cryptographic hash value and the second cryptographic hash value;

seeding a pseudo-random number generator with the third cryptographic hash value;

generating an asymmetric cryptographic key pair using the pseudo-random number generator; and storing the asymmetric cryptographic key pair as the virtual endorsement key.

6. A method of generating a virtual endorsement key for a virtual trusted platform module within a data processing system that includes a physical trusted platform module, the method comprising:

determining to generate a virtual endorsement key within the data processing system;

computing a first cryptographic hash value from a platform signing key that is stored in the physical trusted platform module;

computing a second cryptographic hash value from data associated with a software component on the data processing system;

computing a third cryptographic hash value from a concatenation of the first cryptographic hash value and the second cryptographic hash value;

seeding a pseudo-random number generator with the third cryptographic hash value;

generating an asymmetric cryptographic key pair using the pseudo-random number generator; and storing the asymmetric cryptographic key pair as the virtual endorsement key in the data processing system.

* * * * *